(12) United States Patent
Shima

(10) Patent No.: US 6,839,101 B2
(45) Date of Patent: Jan. 4, 2005

(54) ELECTRONIC APPARATUS WITH LCD

(75) Inventor: Makoto Shima, Shizuoka (JP)

(73) Assignee: NEC Corporation, Tokyo (JP)

( * ) Notice: Subject to any disclaimer, the term of this patent is extended or adjusted under 35 U.S.C. 154(b) by 56 days.

(21) Appl. No.: 10/124,714

(22) Filed: Apr. 18, 2002

(65) Prior Publication Data
US 2002/0158999 A1 Oct. 31, 2002

(30) Foreign Application Priority Data
Apr. 20, 2001 (JP) ......................................... 2001-122812

(51) Int. Cl.[7] .......................................... G02F 1/1333
(52) U.S. Cl. ............................. 349/58; 349/68; 349/67
(58) Field of Search ............................... 349/33, 1, 58, 349/74, 83, 113, 114; 345/156–184; 455/566

(56) References Cited

U.S. PATENT DOCUMENTS

| 5,896,575 | A | * | 4/1999 | Higginbotham et al. .... 455/566 |
| 6,144,358 | A | * | 11/2000 | Narayanaswamy et al. . 345/102 |
| 6,207,912 | B1 | * | 3/2001 | Persson ....................... 200/305 |
| 6,466,202 | B1 | * | 10/2002 | Suso et al. .................. 345/169 |
| 6,671,015 | B2 | * | 12/2003 | Tanada et al. ............... 349/113 |

FOREIGN PATENT DOCUMENTS

| EP | WO 00/36578 | 6/2000 |
| EP | 2 349 784 A | 11/2000 |
| EP | 2 364 462 A | 1/2002 |
| JP | 5-188368 | 7/1993 |
| JP | 2001-51660 | 2/2001 |

* cited by examiner

Primary Examiner—Tarifur R. Chowdhury
Assistant Examiner—Richard H Kim
(74) Attorney, Agent, or Firm—McGinn & Gibb, PLLC

(57) ABSTRACT

An electronic apparatus with a liquid crystal display (LCD) such as a folding cellular phone, by which display contents on the LCD is viewable even when the apparatus is closed, and thus improving the visibility of the LCD. The folding electronic apparatus comprises a display unit housing and an operation unit housing, which are connected by a hinge in a manner permitting a turning movement of each housing. The display unit housing is fitted with a transmissive LCD, both sides of which are viewable, and the operation unit housing has input keys. The apparatus further comprises a display control means for controlling the LCD to display reversed display contents if necessary depending on whether a user views the front side of the LCD or its backside. One side of the operation unit housing, which is in face-to-face contact with the LCD when the apparatus is folded, is reflectorized for reflecting the light to the LCD. Besides, a light source, which is disposed inside the operation unit housing for lighting the input keys, can also illuminate the LCD when the apparatus is folded.

36 Claims, 11 Drawing Sheets

F I G. 13(a)
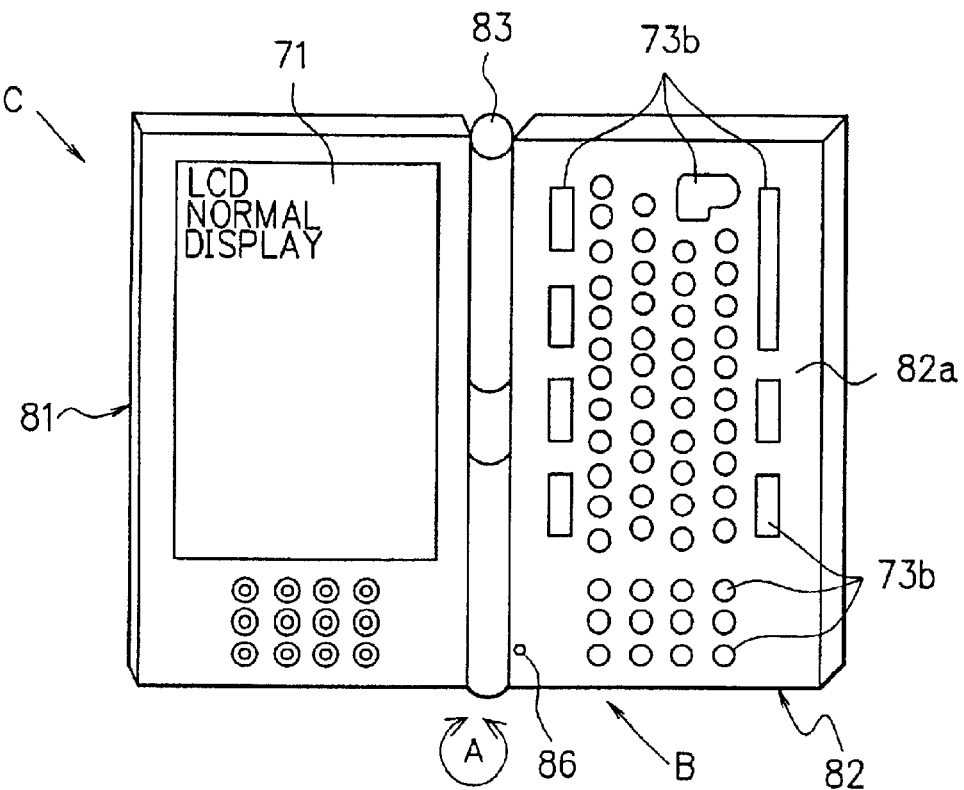
F I G. 13(b)
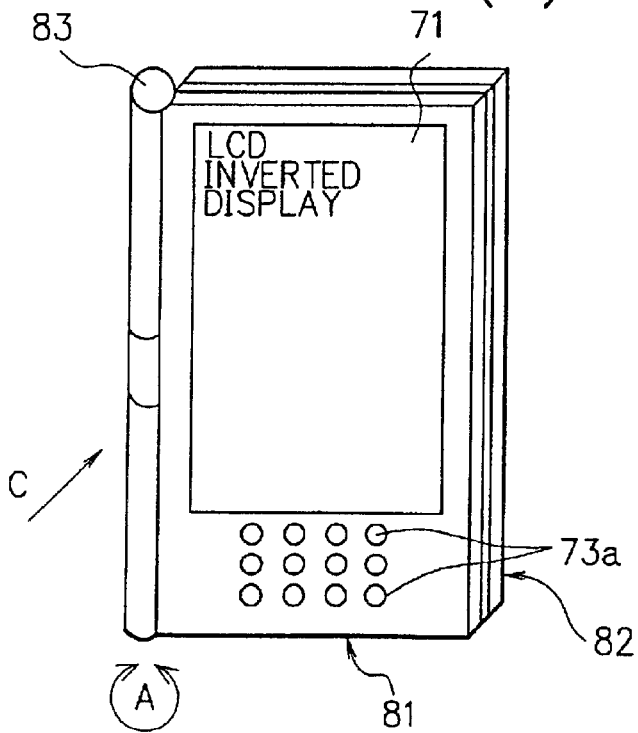

ELECTRONIC APPARATUS WITH LCD

FIELD OF THE INVENTION

The present invention relates to an electronic apparatus with a liquid crystal display (LCD) such as a folding cellular phone, which comprises a display unit housing having an LCD fitted thereon and an operation unit housing provided with input keys etc. being connected to each other in such a manner that the apparatus is foldable.

BACKGROUND OF THE INVENTION

FIGS. 1(a) and 1(b) are diagrams showing a perspective view of a commonly used folding cellular phone as an example of a conventional electronic apparatus with LCD. The cellular phone is folded (open) in FIG. 1(a), and folded (closed) in FIG. 1(b).

As can be seen in FIGS. 1(a) and 1(b), the conventional folding cellular phone comprises a display unit housing 121 and an operation unit housing 122 being connected together by a hinge 123 so as to be foldable. The display unit housing 121 can be turned in the directions indicated by arrow A on the axis of the hinge 123, and also the operation unit housing 122 can be turned in the directions indicated by arrow A. The display unit housing 121 and the operation unit housing 122 are given a platy shape. When the cellular phone is folded, the surfaces of both the housings come in contact with each other.

The display unit housing 121 is fitted with an LCD 101 on the surface, while the operation unit housing 122 has a plurality of input keys (operation buttons) 103 on the surface and side. On the surface of the display unit housing 121, there is also provided a receiver 124 that converts electric oscillation into sound oscillation at the end opposite to where the hinge 123 is fitted. Besides, at the opposite end of the operation unit housing 122's surface from the hinge 123, there is provided a microphone 125.

Such the folding cellular phone is folded as shown in FIG. 1(b) so that it can be stored in a small space when being carried or not in use. During a call on the cellular phone, it is unfolded as shown in FIG. 1(a) and wide opened so as to keep the receiver 124 as far away from the microphone 125 as possible. When unfolded, the cellular phone displays such information as the charge indication of its rechargeable battery, current time and reception condition on the LCD 101 even in a stand-by mode.

In the configuration of the conventional folding cellular phone, however, the LCD 101 is concealed between the display unit housing 121 and the operation unit housing 122, and completely blocked from view when the phone is closed. Therefore, users cannot check the information unless unfolding the cellular phone to bring the LCD 101 into view. Thus, it has been required for users to unfold and fold the cellular phone each time they check the information.

Although it has been proposed to provide another LCD on the backside of the display unit housing 121, the opposite side of the housing 121 to the LCD 101, there arises disadvantages of increasing the number of components, costs, manufacturing processes, and weight of the cellular phone.

Besides, the cellular phone has a limited size to be made smaller and lighter, and there is a limit to the available space for fitting input keys etc. on the surface of the cellular phone. In recent years, the cellular phone is generally provided with an e-mail function and such functions as to view Web sites on the Internet as well as serving as a telephone, and requires keys or buttons for inputting characters and symbols in addition to keys for inputting numbers. However, it is impossible to make room for the dedicated character input keys in an effort to reduce the size and weight of the cellular phone. Accordingly, in the conventional cellular phone, the number input keys have also functioned as character input keys, or an externally connectable keyboard for character input has been used with the cellular phone, which has caused users inconvenience because it is not easy to input characters, or users have to carry around with the character input keyboard in addition to the cellular phone.

SUMMARY OF THE INVENTION

It is therefore an object of the present invention to provide an electronic apparatus with a liquid crystal display (LCD) that is hingedly attached thereto, by which information displayed on the LCD can be easily viewed even when the electronic apparatus is closed, and thus improving the visibility of the display shown on the LCD.

It is another object of the present invention to apply the above-mentioned configuration of the electronic apparatus to a folding cellular phone and the like.

It is still another object of the present invention to provide a small electronic apparatus with LCD, for example, a cellular phone or the like, with enough space for placing input keys.

In accordance with the first aspect of the present invention, to achieve the above object, there is provided an electronic apparatus composed of at least one housing, which is fitted with an LCD in such a manner that display images are viewable on both sides of the LCD.

In accordance with the second aspect of the present invention, there is provided an electronic apparatus composed of two or more housings, which are connected to each other by a hinge in a manner permitting a turning movement of each housing, and one of which is fitted with an LCD in such a manner that display images are viewable on both sides of the LCD.

In accordance with the third aspect of the present invention, the electronic apparatus with LCD in the first or second aspects includes a display control means for controlling the LCD to switch display conditions between normal display, in which display images are not inverted, and inverted display, in which inverted images of the normal display images are displayed.

In accordance with the fourth aspect of the present invention, the electronic apparatus with LCD in the third aspect includes a detector for detecting whether or not the electronic apparatus is open, or on which side of the housing input key operation has been performed, wherein the display control means controls the LCD based on the detection result by the detector.

In accordance with the fifth aspect of the present invention, in the fourth aspect, the switch of the detector is activated when the electronic apparatus is folded/unfolded or by a change in brightness and other magnetic, electrical or mechanical changes.

In accordance with the sixth aspect of the present invention, in one of the second to fifth aspects, a reflective surface is formed on one side of the other housing, which is in face-to-face contact with the housing where the LCD is disposed.

In accordance with the seventh aspect of the present invention, in one of the second to sixth aspects, a light source is disposed inside the other housing.

In accordance with the eighth aspect of the present invention, in the seventh aspect, the light source is an EL device or an LED.

BRIEF DESCRIPTION OF THE DRAWINGS

The objects and features of the present invention will become more apparent from the consideration of the following detailed description taken in conjunction with the accompanying drawings in which:

FIG. 13(a) is a diagram showing a front view of a folding electronic apparatus with LCD according to the third embodiment of the present invention;

FIG. 13(b) is a diagram showing a front view of the folding electronic apparatus of FIG. 13(a) in a closed state;

DESCRIPTION OF THE PREFERRED EMBODIMENTS

Figure 1A:
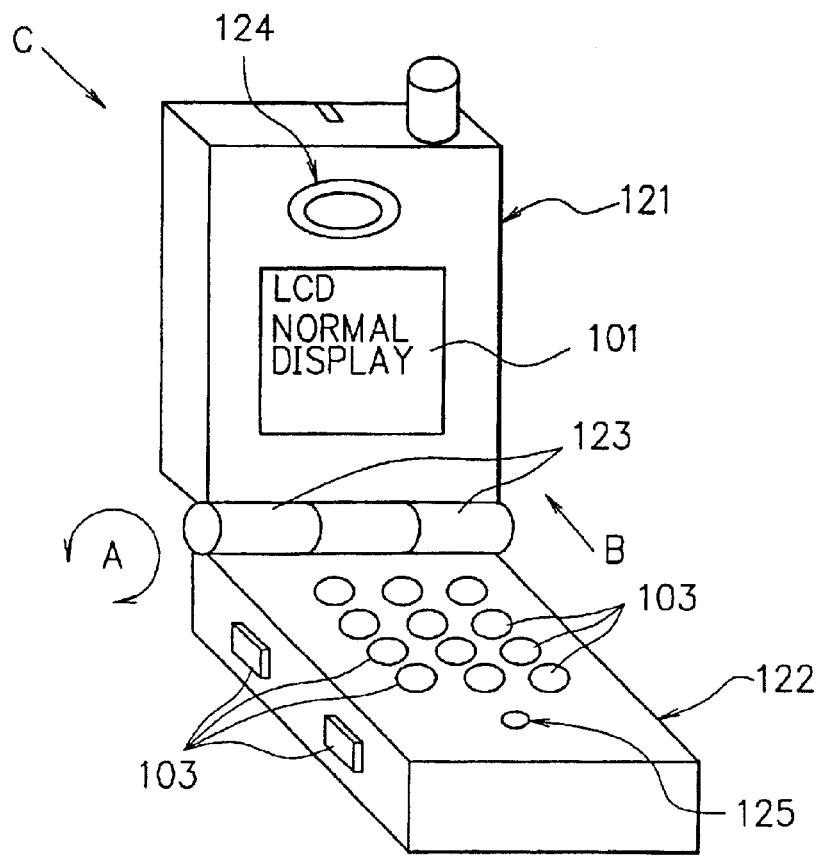
FIG. 1(a) is a diagram showing a perspective view of a commonly used folding cellular phone in an open state.

Referring now to the drawings, a description of a preferred embodiment of the present invention will be given in detail.

[First Embodiment]

Figure 2:
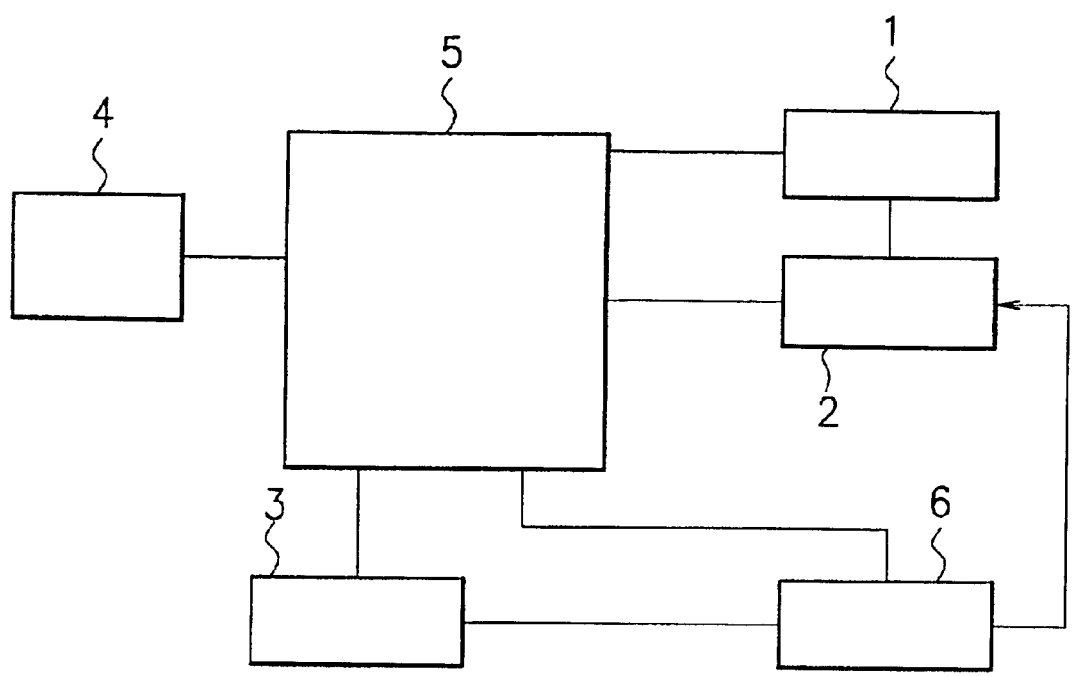
FIG. 2 is a block diagram showing the configuration of an electronic apparatus with LCD according to the first embodiment of the present invention.

FIG. 2 is a block diagram showing the configuration of an electronic apparatus with LCD according to the first embodiment of the present invention.

As can be seen in FIG. 2, the electronic apparatus with LCD comprises a transmissive liquid crystal display (hereinafter referred to as "LCD") 1, a display control means 2 for controlling the display on the LCD, input keys 3 for inputting electrical signals to the electronic apparatus, a peripheral circuit 4 for performing the functions of the electronic apparatus (the functions of a cellular phone in this embodiment), and a control section 5 for controlling the peripheral circuit 4 and the overall performance of the electronic apparatus.

The control section 5 includes a CPU, a memory, an input/output port and the like. The control section 5 may include the display control section 2 and control the display operation of the LCD 1.

Figure 3:
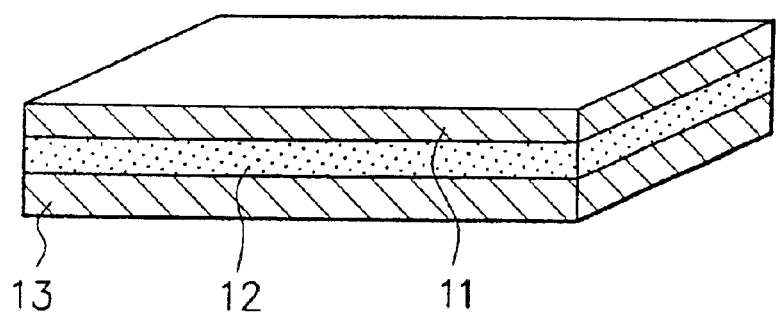
FIG. 3 is a diagram showing the configuration of a general transmissive LCD used for the electronic apparatus.

FIG. 3 is a diagram showing the configuration of a general transmissive LCD used for the electronic apparatus. As shown in FIG. 3, the LCD 1 is composed of transparent plates (glass plates) 11 and 13 with a layer of crystalline liquid therebetween. While glass plates are used in this embodiment, plates that are made of other materials such as plastic, polyester or the like may be used as the transparent plates.

Figure 4A:
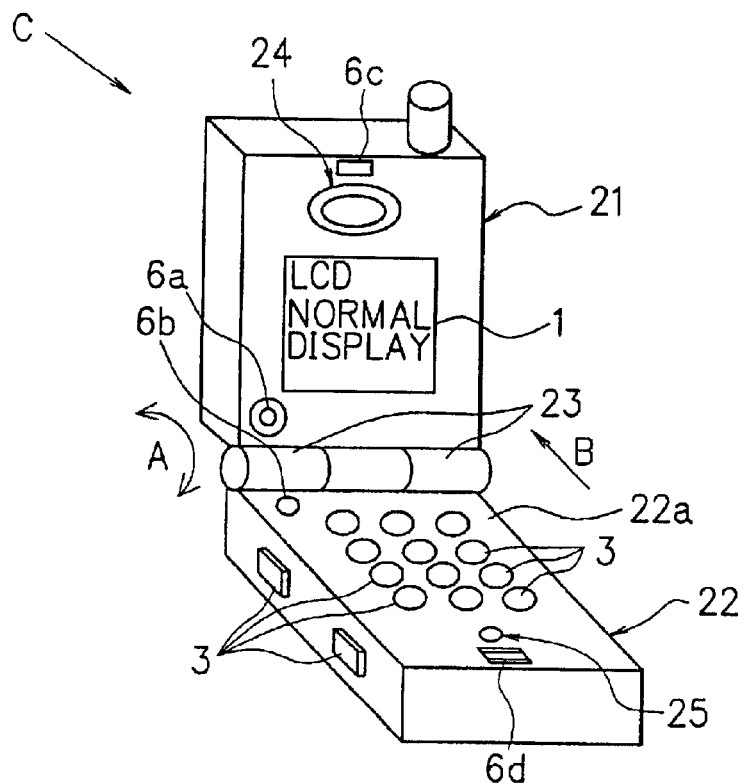
FIG. 4(a) is a diagram showing an application of the present invention, in which the configuration of the electronic apparatus with LCD is applied to a folding cellular phone.
Figure 4B:
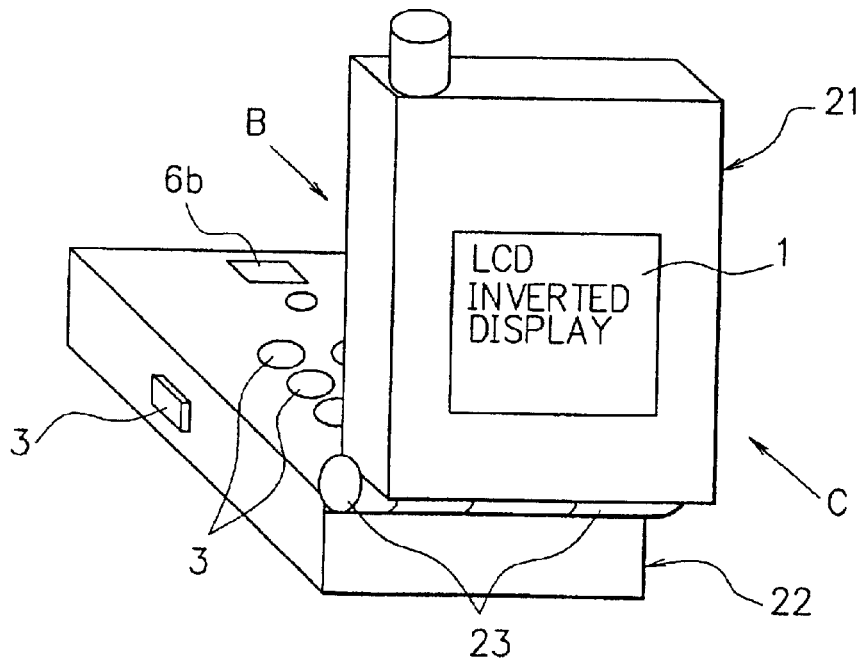
FIG. 4(b) is a diagram showing a back view of the cellular phone of FIG. 4(a)

FIGS. 4(a) and 4(b) are diagrams illustrating an application of the present invention, in which the configuration of the electronic apparatus with LCD is applied to a folding cellular phone. FIG. 4(a) illustrates the unfolded cellular phone viewed in the direction of arrow B. FIG. 4(b) illustrates the cellular phone of FIG. 4(a) viewed in the direction of arrow C, namely, the direction opposite to the direction of arrow B.

As shown in FIGS. 4(a) and 4(b), the cellular phone in this embodiment comprises a display unit housing 21, an operation unit housing 22, and a hinge 23. The housings 21 and 22 are connected by the hinge 23 so as to move round as the cellular phone is folded/unfolded, or opened/closed. Both of the display unit housing 21 and the operation unit housing 22 relatively move in the directions indicated by arrow A on the axis of the hinge 23. The housings 21 and 22 are given a platy shape, and brought in face-to-face contact when the cellular phone is folded into two. The cellular phone has the same construction as that of the conventional one.

The display unit housing 21 is fitted with the LCD 1, and the operation unit housing 22 has the input keys 3 for operating the cellular phone on the surface and sides. On the surface of the display unit housing 21, there is also provided a receiver 24 that converts electrical signals into sound at the end away from the hinge 23. Besides, the operation unit housing 22 is further provided with a microphone 25 at the end of the surface away from the hinge 23. When the cellular phone is folded, one side of the LCD 1 is in face-to-face contact with the surface 22a, on which the input keys 3 and microphone 25 are disposed.

In this embodiment, the display unit housing 21 has a frame shape with a hollow space in the vicinity of the center, and the LCD 1 is fitted into the space so as to be viewable whether the cellular phone is open or not. That is, the contents displayed on the LCD 1 can be viewed in the direction of arrow C as well as in the direction of arrow B shown in FIGS. 4(a) and 4(b). In this construction, the display contents are viewable on both sides of the LCD 1, and the LCD 1 is hingedly connected to the operation unit housing 22 through the display unit housing 21.

The display control means 2 controls the LCD 1 to display reversed display contents if necessary depending on whether or not the cellular phone is open, namely, in which direction a user views the LCD 1 (the direction of arrow B or arrow C), so that the display contents are shown appropriately on the respective sides of the LCD 1. Accordingly, the display contents can be easily read or recognized even when the cellular phone is closed because the contents do not look mirror reversed.

More specifically, if an image displayed on a translucent liquid crystal screen is viewed from backside, it will look inverted. Therefore, when display contents properly shown on one side of the LCD 1 are viewed from the other side, the contents have to be inverted in order to look properly. In this embodiment, a display image (including characters) that appears properly without being inverted is called normal display, and a display image that is inverted to appear properly is called inverted display. A display image shown on the front side (the side on which the receiver 24 is disposed) of the LCD 1, namely, a display image viewed in the direction of arrow B, is defined as the normal display, and a display image viewed from the backside, in the direction of arrow C is defined as the inverted display. That is, the respective sides of LCD 1 display a mirror-reversed image (a bilaterally symmetrical image) of each other. The display image may be inverted in horizontal direction or vertical direction.

The cellular phone may further comprise a detector 6 for monitoring and detecting the state of the cellular phone so that the display control means 2 can determine whether the cellular phone is open or closed. The detector 6 monitors the state of the LCD 1 by detecting whether or not the LCD 1 is in contact with the operation unit housing 22. Examples of the detector 6 include a photo sensor using a photodiode or a phototransistor, an electromagnetic switch, and other electrical or mechanical switches.

Preferably, as shown in FIG. 4(*a*), the detector 6 includes a detecting part 6*a* disposed near the hinge 23 on the surface of the display unit housing 21 and a detecting part 6*b* located so as to correspond to the part 6*a* on the surface of the operation unit housing 22, or a detecting part 6*c* disposed near the receiver 24 on the display unit housing 21 and a detecting part 6*d* located so as to correspond to the part 6*c* on the operation unit housing 22. In addition, the detector 6, which includes the detecting parts 6*a* and 6*b* or 6*c* and 6*d*, preferably serves as a changing-over switch that is activated when the cellular phone is folded/unfolded or by a change in brightness and other magnetic, electrical or mechanical changes. Besides, the detector 6 may monitor input operation performed by a user to switch the display image on the LCD 1 between the normal display and inverted display for controlling the LCD 1 in response to the input operation.

As described above, in the folding cellular phone according to the first embodiment of the present invention, even when the cellular phone is closed with the front sides of the display unit housing 21 and operation unit housing 22 (the sides on which the receiver 24 and the microphone 25 are disposed, respectively) being in face-to-face contact, the inverted display is shown on the backside of the LCD 1, and proper display contents are viewable.

At least part of the surface 22*a* of the operation unit housing 22, which faces the LCD 1 when the cellular phone is closed, and the surfaces of the input keys 3 disposed thereon are reflexible. Consequently, the LCD 1 is lit by the reflected light from the reflective surface of the housing 22 when the cellular phone is closed and the LCD 1 is in face-to-face contact with the housing 22. Thus, the visibility of the display on the LCD 1 is improved in bright places. To put it concretely, in bright places, when the cellular phone is folded and one surface of the LCD 1 is in face-to-face contact with the reflective surface of the housing 22, the incident light from the other side of the LCD 1 transmits through the LCD 1 and reflects off the reflective surface to the LCD 1. On this occasion, the display control means 2 controls the display image on the LCD 1 so that display contents can be viewed appropriately from the other side. Accordingly, the visibility of the display on the LCD 1 in bright places can be improved by reflecting the environment light to the LCD 1 using the reflective surface of the operation unit housing 22.

At least part of the input keys 3 is made of light-transmittable material, and a light source (not shown in FIG. 4) is placed inside the housing 22 for lighting the input keys 3 from behind. Consequently, the input keys 3 can be recognized even in the dark places by the light from the light source. In addition, the light source for lighting the input keys 3 also illuminates the LCD 1 when the cellular phone is folded and the LCD 1 comes in face-to-face contact with the housing 22. Thus, the visibility of the display on the LCD 1 is improved in dark places. To put it concretely, in dark places, when the cellular phone is folded and one side of the LCD 1 is in face-to-face contact with the housing 22, the light from the light source transmits through the input keys 3 and illuminates the LCD 1. On this occasion, the display control means 2 controls the display image on the LCD 1 so that display contents can be viewed appropriately from the other side. Accordingly, the visibility of the display on the LCD 1 in dark places can be improved by illuminating the LCD 1 from the light source disposed inside the operation unit housing 22.

In order to implement the above construction in which the surface 22*a* and the input keys 3 includes reflective surfaces, and the light source for lighting the input keys 3 is capable of illuminating the LCD 1, the surface 22*a* and the input keys 3 may be made of such material as is semi-reflexible and also semi-pervious to the incident light.

The light source can be controlled to emit or not to emit light and adjust light intensity depending on the situation. Thus the visibility of the display on the LCD 1 is improved in both bright and dark places, and the display function of the LCD 1 is enhanced.

Figure 5:
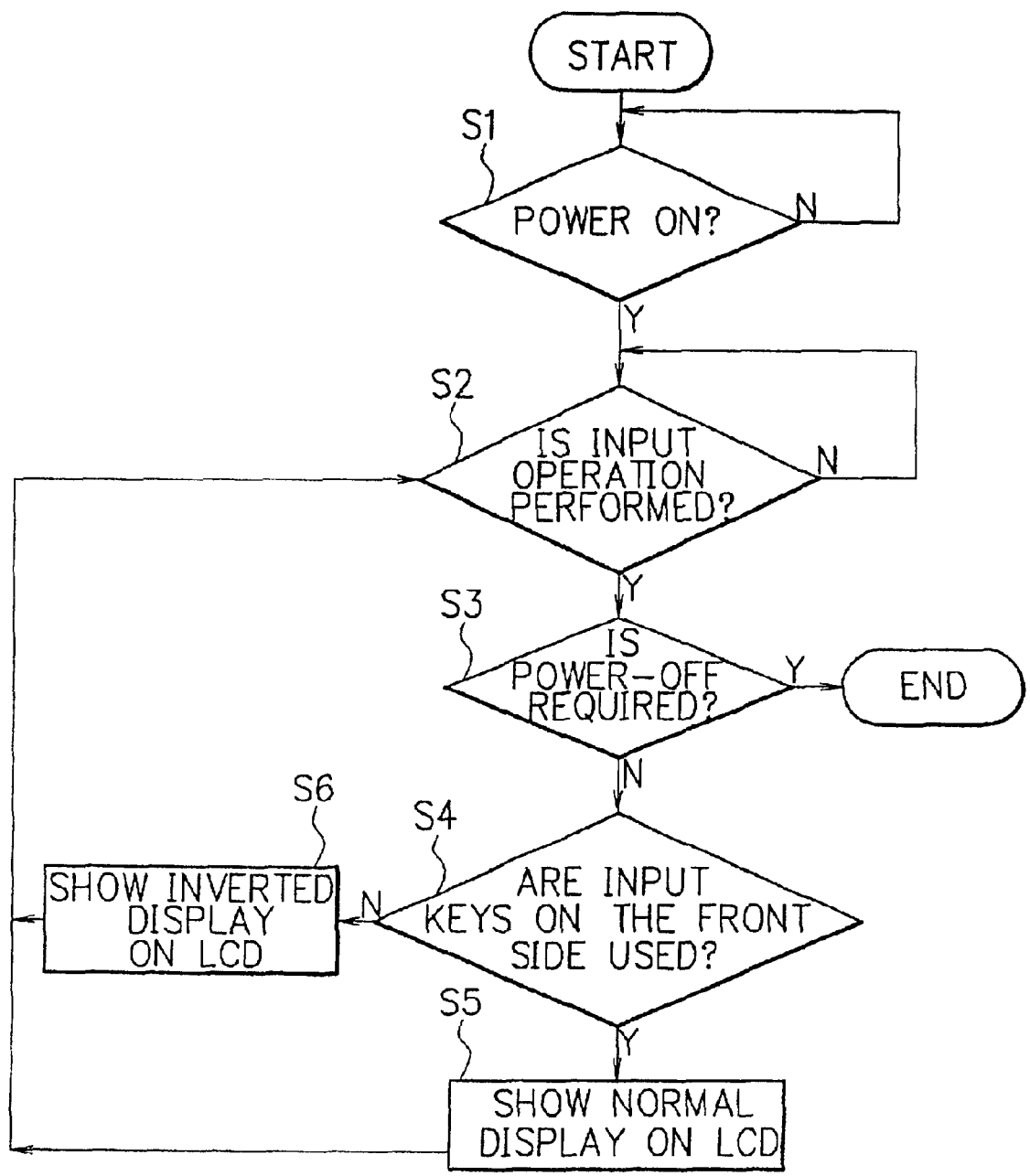
FIG. 5 is a flowchart for explaining the operation of the cellular phone shown in FIG. 4.

In the following, the operation of the circuit comprised in the electronic apparatus with LCD shown in FIG. 2 will be described with reference to FIGS. 2, 4 and 5 by taking the cellular phone of this embodiment as an example. FIG. 5 is a flowchart for explaining the operation of the cellular phone shown in FIG. 4.

When a user makes a phone call etc., the folding cellular phone shown in FIG. 4 is unfolded and operated with the input keys 3. While the cellular phone is open, the LCD 1 shows the normal display on the front side by the control of the display control means 2 so that display contents on the LCD 1 is properly readable or recognizable when viewed in the direction of arrow B. After the user completes the phone call, when the folding cellular phone is in stand-by mode or being carried around, the phone is folded. On this occasion, the display control means 2 determines that the cellular phone is closed according to the monitoring by the detector 6, and switches the display condition of the LCD 1 to the inverted display. Thereby, the LCD 1 shows the inverted display on the backside so that display contents on the LCD 1 is properly readable or recognizable when viewed in the direction of arrow C. Then, if the user unfolds the cellular phone again, the display control means 2 switches the display condition of the LCD 1 to the normal display. Accordingly, the user can view a proper display image on the front side of the LCD 1.

The above operation will be described referring to the flowchart shown in FIG. 5. In the cellular phone, user's input operation is monitored by the control section 5 or the detector 6 (detecting parts 6a and 6b) in cooperation with the input keys 3 (step S1). When the cellular phone is turned on by an input operation (step S1, Y), the control section 5 starts monitoring of input operations (step S2). When the control section 5 detects an input operation (step S2, Y), and if the input operation has been performed for turning off the power of the cellular phone (step S3, Y), the control section 5 turns off the cellular phone. If not (step S3, N), the control section 5 locates the input keys 3 used for the input operation. When the input keys 3 on the front side of the operation unit housing 22 have been used (step S4, Y), the display control means 2 controls the LCD 1 to show the normal display (step S5). When the input keys 3 on the other side have been used (step S4, N), the display control means 2 controls the LCD 1 to show the inverted display (step S6). The control section 5 maintains constant monitoring of input operation, and the processes are repeated from step S2.

When the electronic apparatus is foldable as with folding cellular phones, it includes the detector 6 for monitoring and detecting the state of the electronic apparatus so that the display control means 2 can determine whether the apparatus is open or closed. The display control means 2 controls the LCD 1 to display the normal display or inverted display depending on how the user uses the electronic apparatus based on the detection result from the detector 6.

This operation will be described referring to the flowchart shown in FIG. 6. User's actions to fold/unfold the cellular phone are monitored by the detector 6 (step S11). When the detector 6 detects that the cellular phone is open (step S11, Y), the display control means 2 controls the LCD 1 to show the normal display (step S12). On the other hand, when the detector 6 detects that the cellular phone is closed (step S11, N), the display control means 2 controls the LCD 1 to show the inverted display (step S13).

In the above operation, the control section 5 may control the display control means 2 to switch the display condition of the LCD 1 based on the detection result by the detector 6, or the display control means 2 may directly control the display condition of the LCD 1 based on the detection result by the detector 6.

In addition, the electronic apparatus with LCD may include the input keys 3 on the sides of display unit housing 21 and the operation unit housing 22 and perform such operation as below.

The operation will be described referring to the flowchart shown in FIG. 7. User's actions to fold/unfold the cellular phone are monitored by the detector 6 (step S21). When the detector 6 detects that the cellular phone is open (step S21, Y), the display control means 2 controls the LCD 1 to show the normal display (step S22). On the other hand, when the detector 6 detects that the cellular phone is closed (step S21, N), the display control means 2 controls the LCD 1 to show the inverted display (step S23). When input operation is detected, the control section 5 or the detector 6 determines whether or not the input operation has been performed for switching the display condition of the LCD 1 (step S24). If not (step S24, N), the operation returns to step S21, and the detector 6 carries on monitoring of the open/closed state of the cellular phone. If the input operation has been performed for switching the display condition of the LCD 1 (step S24, Y), the display control means 2 compares the current display state of the LCD 1 with the display state required by the user. When the current state matches the required state (step S25, N), the display control means 2 does not switch the display condition of the LCD 1. Then, the operation returns to step S21, and the detector 6 carries on monitoring of the state of the cellular phone. When the current state does not match the required state and needs to be switched (step S25, Y), the display control means 2 switches the display condition of the LCD 1 (step S26). Then, the operation returns to step S21, and the detector 6 carries on monitoring of the state of the cellular phone.

In the above operation, the control section 5 may control the display control means 2 to switch the display condition of the LCD 1, or the display control means 2 may directly control the display condition of the LCD 1.

As described above, the electronic apparatus with LCD of the present invention enables users to view the display contents from both side of the LCD by adopting a transmissive LCD and a display control means.

Figure 1B:
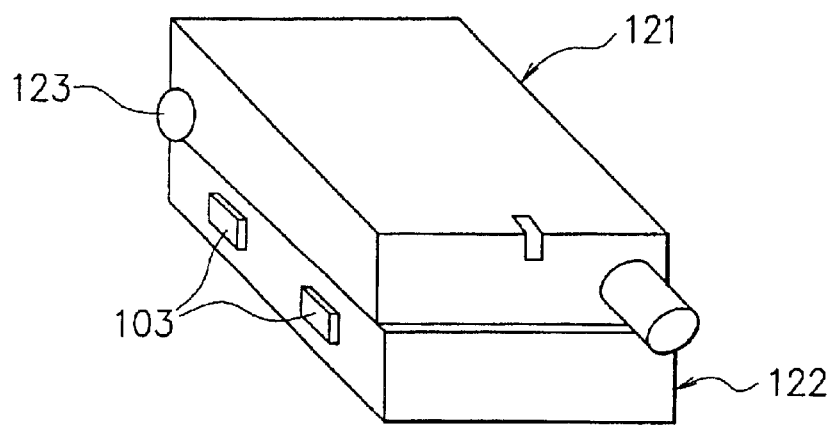
FIG. 1(b) is a diagram showing the folding cellular phone of FIG. 1(a) in a closed state.

In the conventional folding cellular phone shown in FIG. 1, the LCD 101 is concealed when the cellular phone is closed, and therefore users cannot check such information as the charge indication of the battery, current time and reception condition displayed on the LCD 101. Moreover, a battery charging rack of the conventional cellular phone is designed so that the cellular phone is set thereon in an open state in order that users can check the charge indication of the battery during battery charging. Thus, the cellular phone takes up more space in the longitudinal direction while being charged.

On the other hand, in the folding cellular phone according to the first embodiment of the present invention, both sides of the LCD 1 are viewable. Besides, the display control means 2 determines whether or not to invert display images according to the state of the cellular phone. In other words, the display condition of the LCD 1, namely, the normal display or inverted display, is controlled in such a manner that the normal display is shown when the cellular phone is open, and the inverted display is shown when the cellular phone is closed. That is, the LCD 1 is capable of two types of display (normal display and inverted display) so that the user can view proper display images on the respective sides. Thus, the display contents on the LCD can be checked even when the cellular phone is folded, which spares users the trouble of unfolding the cellular phone only for checking information such as the charge indication of the battery or current time.

With this construction, the charge indication can be easily checked without unfolding the cellular phone while charging the battery. In addition, space can be saved compared with the battery charging for the unfolded cellular phone.

Moreover, according to this embodiment, even if the cellular phone is put in an in-vehicle phone holder in a closed state, users can check display contents without unfolding the cellular phone. When the cellular phone is put in the holder in an open state, it is likely that driver's elbow touches the phone as he/she operates the gear lever etc. depending on the location of the holder. This can be dangerous. Thus, it is not only space saving but also an important advantage over safe driving that the cellular phone can be folded in half when put in the in-vehicle phone holder.

Besides, a light emitting diode (LED) and an additional LCD have been provided on the backside of the conventional cellular phone for enabling users to check minimum information while the cellular phone is closed. However, according to the first embodiment of the present invention, an electronic apparatus with LCD does not need another LCD for showing display contents including information on received calls and current time etc. while the cellular phone is closed. Thus it is possible to overcome disadvantages in the conventional cellular phone such as increasing the number of components, costs, manufacturing processes, and weight of the cellular phone, caused by the additional LED and LCD.

While an electronic apparatus with LCD according to the first embodiment of the present invention has been described by taking a folding cellular phone as an example, the present invention can be applied to other foldable electronic apparatuses having LCD without any restriction.

[Second Embodiment]

In the following, an electronic apparatus with LCD according to the second embodiment of the present invention will be explained.

Figure 8:
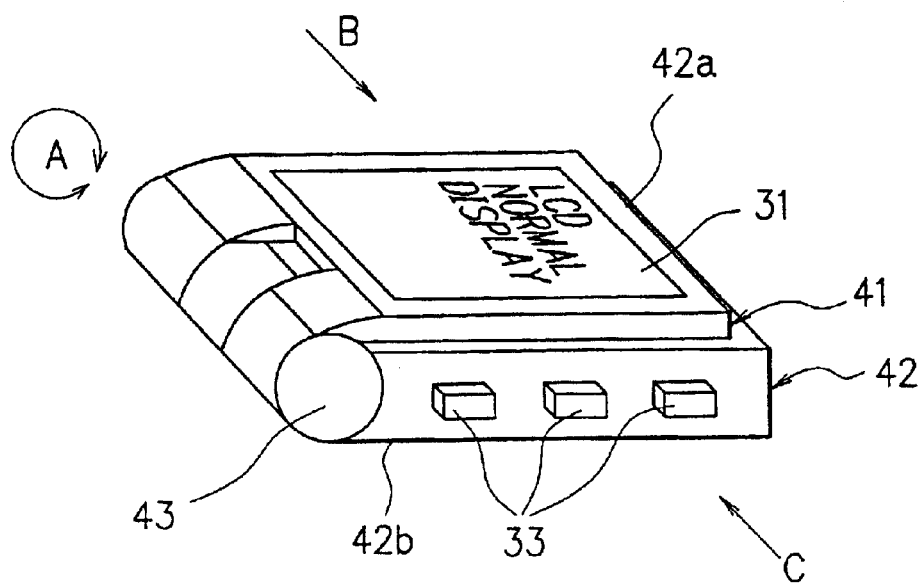
FIG. 8 is a diagram showing a perspective view of a folding electronic apparatus with LCD according to the second embodiment of the present invention.
Figure 9:
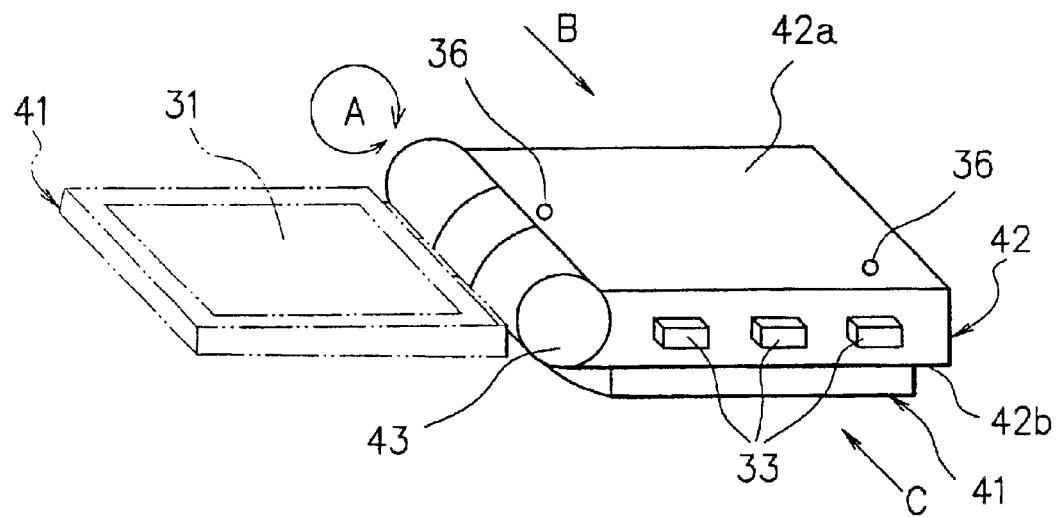
FIG. 9 is a diagram showing the folding electronic apparatus of FIG. 8 in an open state.
Figure 10:
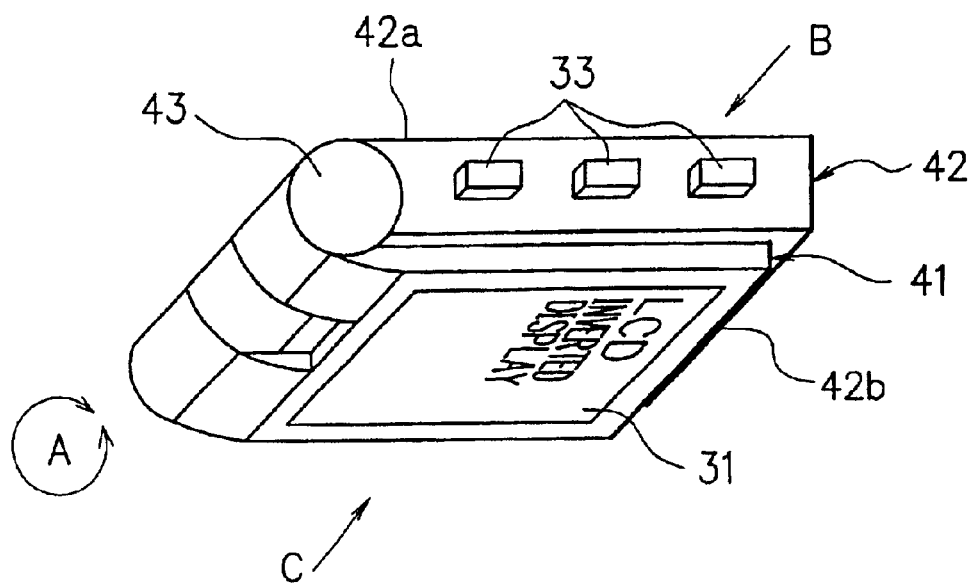
FIG. 10 is a diagram showing a back view of the folding electronic apparatus of FIG. 8.

FIGS. 8 to 10 are diagrams showing the perspective views of a folding electronic apparatus with LCD. As can be seen in FIG. 8, the electronic apparatus with LCD in this embodiment comprises a display unit housing 41 and an operation unit housing 42, which are connected with each other by a hinge 43 in a manner permitting a turning movement of each housing. The display unit housing 41 is supported from the hinge 43, and capable of turning in the directions indicated by arrow A in FIGS. 8 to 10 on the axis of the hinge 43. The housing 41 can be rotated as far as 360 degrees relative to the housing 42. The housings 41 and 42 are given a platy shape, and brought in face-to-face contact when the apparatus is folded into two.

The display unit housing 41 supports an all-transmissive LCD 31. The housing 41 has a frame shape with a hollow space in the center, and the LCD 31 is fitted into the space. The LCD 31 has the same construction as described previously for the LCD 1 in the first embodiment. The operation unit housing 42 includes input keys 33 on the surfaces and sides for inputting electronic signals to the apparatus, and a peripheral circuit 34, which will be described later, inside it.

As shown in FIG. 9, the operation unit housing 42 has surfaces 42a and 42b, on which input keys (not shown) are disposed. While in this embodiment, input keys are disposed on both sides of the housing 42, the keys may be provided on only one side. FIG. 8 is a view of the closed electronic apparatus with the housing 41 lying on the surface 42a. FIGS. 9 and 10 are views of the closed electronic apparatus with the housing 41 lying on the surface 42b.

For the LCD 31, the side that is in face-to-face contact with the surface 42a when the apparatus is closed as shown in FIG. 8 is defined as the backside, and the opposite side is defined as the front side. Further, in this embodiment, a display image (including characters) appearing properly on the front side of the LCD 31, namely, a display image viewed in the direction of arrow B, is regarded as the normal display. On the other hand, a display image appearing properly on the backside, namely, a display image viewed in the direction of arrow C, is regarded as the inverted display.

The surface 42a has a detector 36 at the end opposite to where the hinge 43 is fitted. The detector 36 monitors the state of the electronic apparatus to detect whether the apparatus is open or closed. Incidentally, the detector 36 may be disposed near the hinge 43 on the surface 42a as shown in FIG. 9. The surface 42b is also provided with a detector for monitoring the state of the apparatus to detect whether the apparatus is open or closed.

The electronic apparatus with LCD in the second embodiment has the same construction as described previously for the electronic apparatus in the first embodiment with reference to FIG. 2. The apparatus of this embodiment also comprises a display control means for controlling the LCD 31 to switch display conditions between the normal display and inverted display if necessary depending on whether the LCD 31 lies on the surface 42a or the surface 42b, namely, in which direction a user views the LCD 31. The display control means controls display images on the LCD 31 based on the detection results obtained by the detectors disposed on the surfaces 42a and 42b. Thus, similarly to the first embodiment, display contents can be checked on both sides of the LCD 31.

In the same fashion with this embodiment as with the first embodiment, the surface 42a is reflectorized by means of, for example, applying a coating that includes silver thereto. Other coatings or layers may be used for reflectorizing the surface 42a without any limitation to the material and method. Much the same is true on the first embodiment. With this construction, when the electronic apparatus is folded so that the display unit housing 41 lies on the surface 42a as shown in FIG. 8, the surface 42a reflects the light to the LCD 31 from behind.

Besides, at least part of the input keys disposed on the surface 42b is made of light-transmittable material, and a light source such as an electro luminescent (EL) device or LED is placed inside the housing 42 for lighting the input keys from behind. With this construction, when the electronic apparatus is folded so that the display unit housing 41 lies on the surface 42b as shown in FIGS. 9 and 10, the light source serves as a backlight for lighting the LCD 31 through the input keys. Thus, the visibility of the display on the LCD 31 can be improved by putting the LCD 31 on either the surface 42a or 42b depending on whether the apparatus is used in a bright place or dark place, and the display function of the LCD 31 is enhanced for both bright and dark places.

Figure 11:
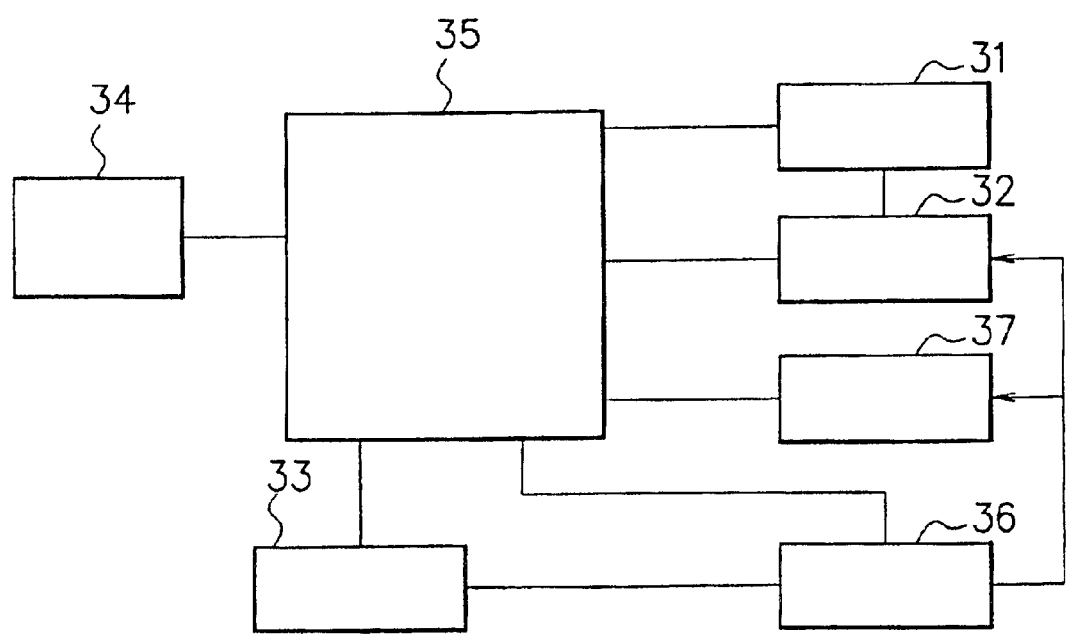
FIG. 11 is a block diagram showing the configuration of the electronic apparatus with LCD according to the second embodiment of the present invention.

FIG. 11 is a block diagram showing the configuration of the electronic apparatus with LCD according to the second embodiment of the present invention. The electronic apparatus with LCD comprises an LCD 31, a display control means 32 for controlling the LCD 31, input keys 33 for inputting signals from the outside, a peripheral circuit 34 for performing the functions of the electronic apparatus (for example, the functions of a cellular phone), a control section 35 for controlling the peripheral circuit 34 and the overall performance of the electronic apparatus, detectors 36, and a backlight 37.

The control section 35 includes a CPU, a memory, an input/output port and the like. The control section 35 may include the display control section 32 and control the display operation of the LCD 31.

The backlight 37 is disposed behind the surface 42b (inside the operation unit housing 42) as is described above, and turned on when input operation is performed with the input keys 33. In addition, when the detectors 36 (or the control section 35) detects that the electronic apparatus is folded in such a manner that the housing 41 lies on the surface 42b as shown in FIGS. 9 and 10, the display control means 32 turns on the backlight 37 as well as controlling the LCD 31 to display images on the backside, namely, to switch the display condition of the LCD 31 to the inverted display.

The operation of the electronic apparatus with LCD in the second embodiment is approximately the same as that described in connection with FIGS. 5 to 7 in the first embodiment, and therefore will be described briefly referring to those FIGS.

Figure 6:
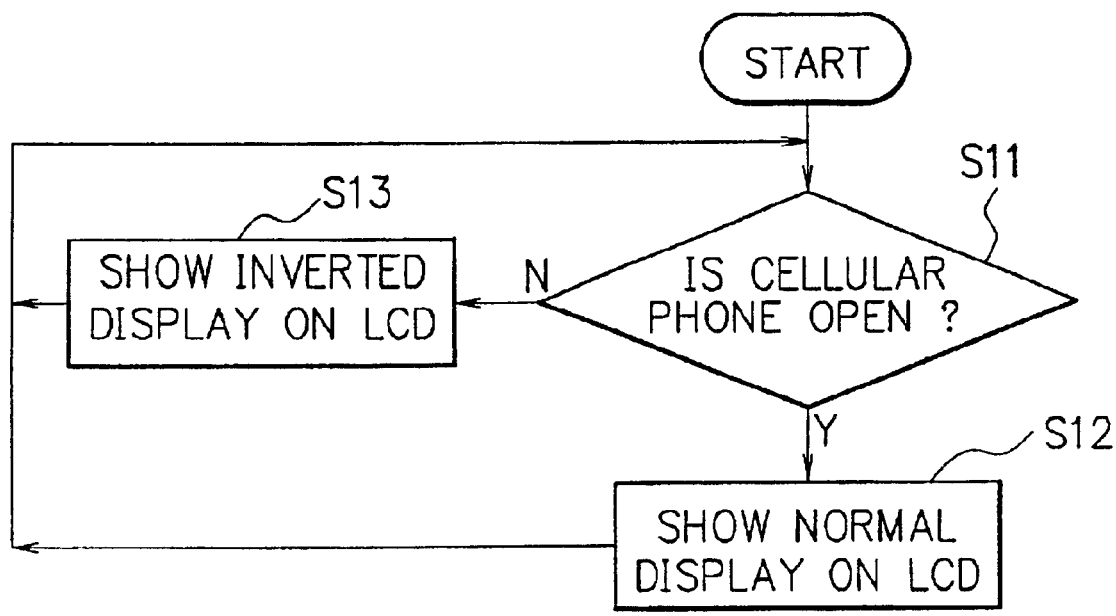
FIG. 6 is a flowchart for explaining the operation to control display conditions of the LCD in the operation of FIG. 5.

In the flowchart of FIG. 6, the backlight 37 may be turned on automatically according to the detection result from the detector 36 at step S11.

Figure 7:
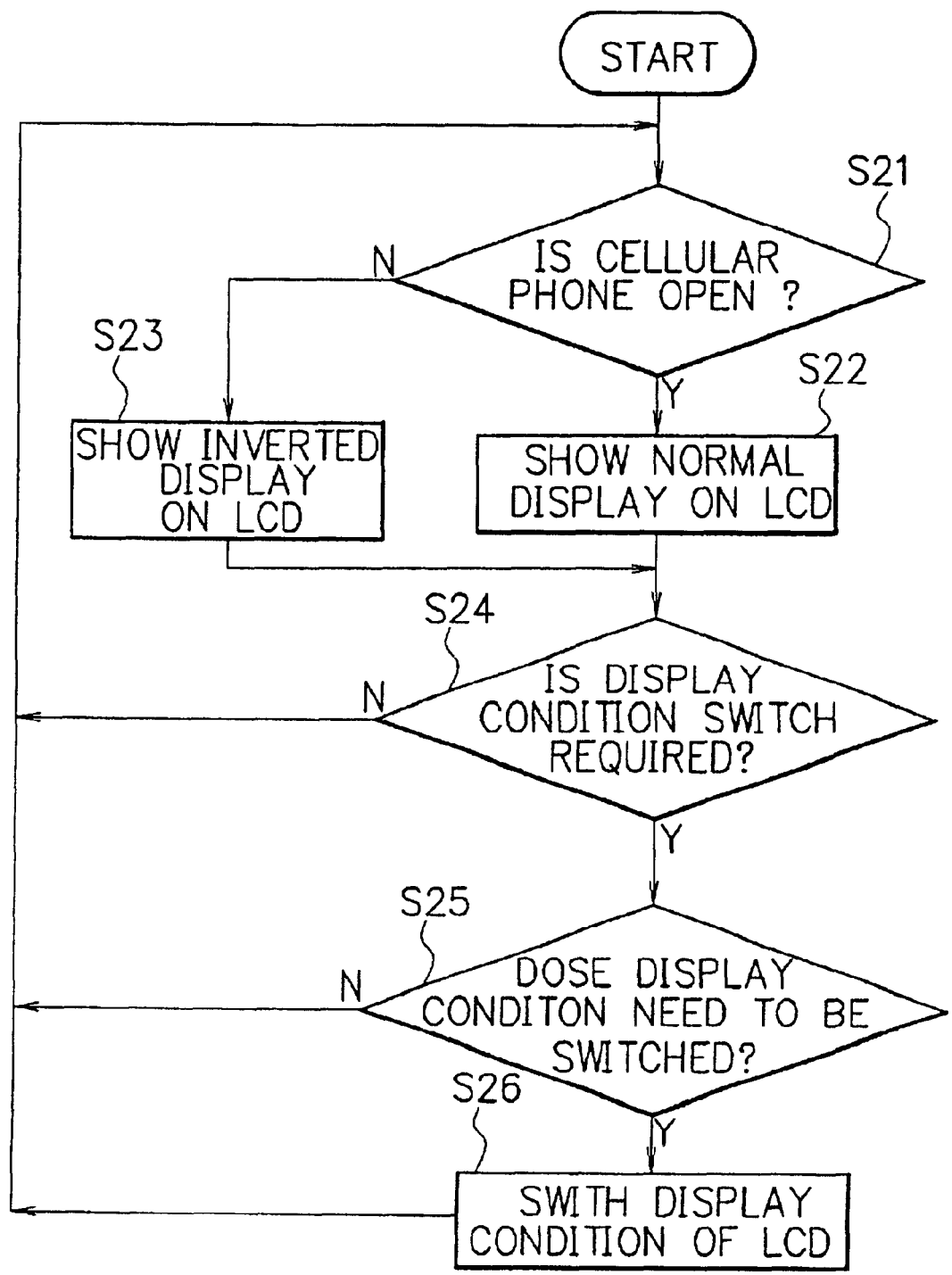
FIG. 7 is a flowchart for explaining the operation on a cellular phone having input keys also on the sides.

Similarly, in the flowchart of FIG. 7, the backlight 37 may be turned on automatically according to the detection result from the detector 36 at step S21. Additionally, at step S24 or S25, it may be determined whether or not the backlight is to be turned on.

With this construction, when the electronic apparatus is folded so that the display unit housing 41 lies on the surface 42a, the LCD 31 is lit by the reflected light from the surface 42a, and thereby serves as an all-reflective LCD. Thus, the visibility of display images on the LCD 31 is improved in bright places. Moreover, when the electronic apparatus is folded so that the housing 41 lies on the surface 42b, the LCD 31 is illuminated by the light from the backlight 37 disposed behind the surface 42b, and thereby serves as an all-transmissive LCD. Thus, the visibility of display images on the LCD 31 is improved in dark places.

As a prior apparatus, there is disclosed an electronic apparatus with all-reflective/all-transmissive LCD in Japanese Patent Application laid open No. HEI5-188368. The prior apparatus has a display section including an LCD and a backlight. The LCD is provided with a reflecting board, which is detachable in order to realize its all-reflexivity and all-transmissibility. With the prior apparatus, the visibility of the display on the LCD is improved. However, there is a disadvantage that users have to carry the reflecting board with the apparatus.

On the other hand, in the electronic apparatus with LCD according to this embodiment, the display unit housing 41 is hingedly connected to the operation unit housing 42, and by putting the housing 41 on the respective sides of the housing 42, the LCD 31 is able to function as an all-reflective/all-transmissive LCD as is described above. Thus, it is possible to remove the disadvantage of having to carry the reflecting board in addition to the apparatus. Besides, the danger of losing the reflecting board is obviated.

Figure 12:
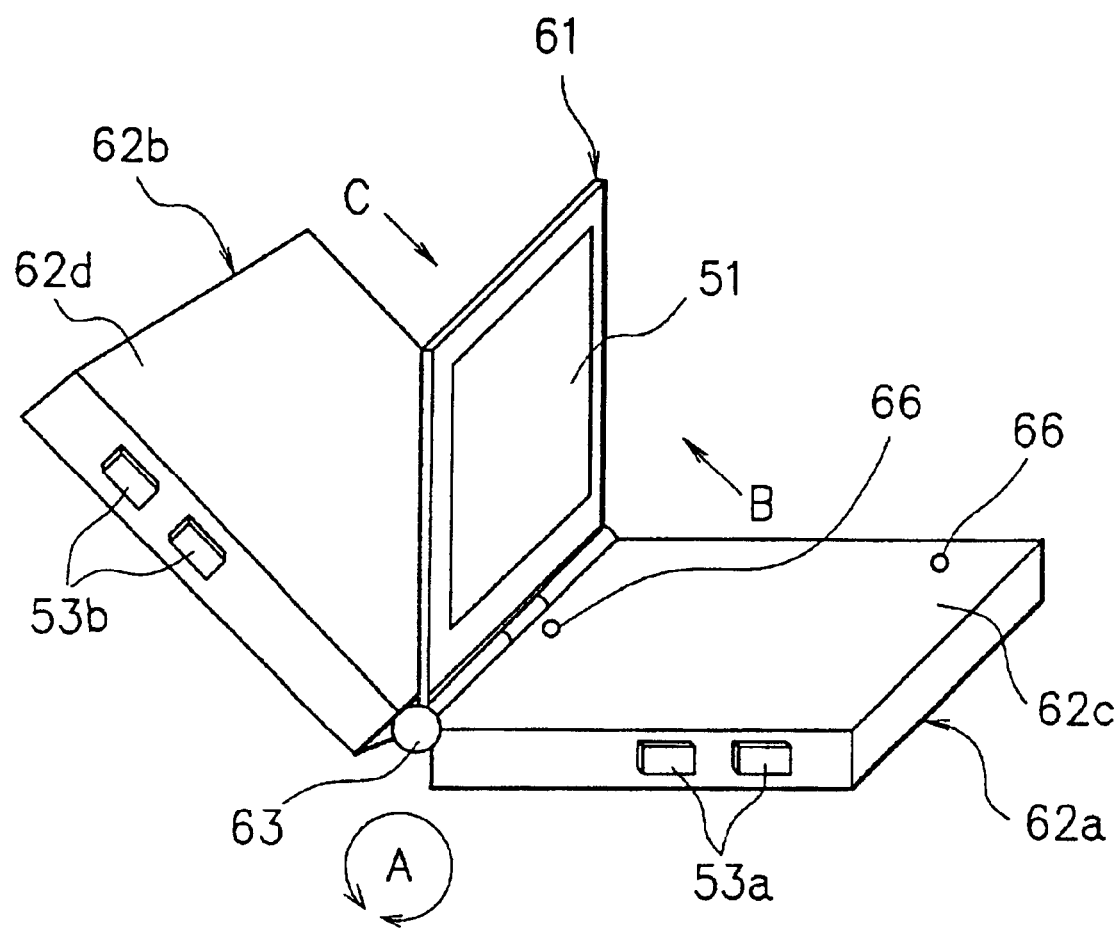
FIG. 12 is a diagram showing another example of the electronic apparatus according to the second embodiment of the present invention.

Incidentally, while one operation unit housing 42 is provided with the reflective surface and the backlight 37 in the construction of the electronic apparatus shown in FIGS. 8 to 10, the electronic apparatus may include two operation unit housings as shown in FIG. 12.

FIG. 12 is a diagram showing another example of the electronic apparatus according to the second embodiment of the present invention. Referring to FIG. 12, the folding electronic apparatus with LCD comprises a display unit housing 61 fitted with an all-transmissive LCD 51, a first operation unit housing 62a, a second operation unit housing 62b, and a hinge 63. The housings 61, 62a and 62b are connected by the hinge 63 in a manner permitting a turning movement of each housing. Thus the housing 61 can be laid on both the housings 62a and 62b. With this construction, the first and second units 62a and 62b can be turned in the directions indicated by arrow A in FIG. 12 on the axis of the hinge 63 in the range of approximately 360 degrees relative to each other. The display unit housing 61 can be also turned in the directions of arrow A in the range of approximately 360 degrees relative to the housings 62a and 62b.

When the display unit housing 61 is laid on the first unit 62a, one side of the LCD 51 is in face-to-face contact with a surface 62c of the housing 62a. When the display unit housing 61 is laid on the second unit 62b, the other side of the LCD 51 is in face-to-face contact with a surface 62d of the housing 62b. On the surfaces 62c and 62d, input keys for inputting electronic signals to the apparatus are disposed (not shown). The housings 62a and 62b are further provided with input keys 53a and 53b, respectively, on the sides.

The surface 62c has a detector 66 at the end opposite to the end tangent to the hinge 43. The detector 66 monitors the state of the LCD 51 with respect to the first unit 62a by detecting whether or not the LCD 51 lies on the surface 62c. Incidentally, the detector 66 may be disposed near the hinge 63 on the surface 62c as shown in FIG. 12. The surface 62b is also provided with a detector for monitoring the state of the LCD 51 with respect to the second unit 62b by detecting whether or not the LCD 51 lies on the surface 62d.

As with the surface 42a of the electronic apparatus illustrated in FIGS. 8 to 10, the surface 62c is reflectorized by means of, for example, applying a silver coating thereto. Accordingly, when the display unit housing 61 is laid on top of the housing 62a so that the LCD 51 is brought in face-to-face relation with the surface 62c, the surface 62c reflects the light to the LCD 51 from behind. Similarly, the input keys on the surface 62c can be reflectorized by applying such coatings as include silver etc. thereto.

Besides, at least part of the input keys disposed on the surface 62d is made of light-transmittable material, and a light source such as an EL device or LED is placed inside the second unit 62b for lighting the input keys from behind. With this construction, when the display unit housing 61 is laid on top of the housing 62b so that the LCD 51 is brought in face-to-face relation with the surface 62d, the light source serves as a backlight for lighting the LCD 51 through the input keys.

Thus, the display on the LCD 51 can be checked in the right condition for both bright and dark places by using the surface 62c of the first unit 62a as the reflective surface as well as using the surface 62d of the second unit 62b as the backlight.

[Third Embodiment]

In the following, a folding electronic apparatus with LCD according to the third embodiment of the present invention will be explained.

FIGS. 13(a) and 13(b) are diagrams showing the electronic apparatus with LCD according to the third embodiment. The electronic apparatus in the third embodiment has the same construction as described previously for the electronic apparatus in the first embodiment with reference to FIG. 2.

Referring to FIGS. 13(a) and 13(b), the electronic apparatus with LCD in this embodiment comprises a display unit housing 81 and an operation unit housing 82, which are connected with each other by a hinge 83 so that the apparatus is foldable. The housings 81 and 82 can be turned in the directions indicated by arrow A in FIGS. 13(a) and 13(b) on the axis of the hinge 83 as far as approximately 360 degrees relative to each other. The housings 81 and 82 are given a platy shape, and brought in face-to-face contact when the apparatus is folded into two.

The display unit housing 81 supports an all-transmissive LCD 71. The housing 81 has a frame shape with a hollow space in the center, and the LCD 71 is fitted into the space. The LCD 71 has the same construction as described previously for the LCD 1 in the first embodiment. The operation unit housing 82 includes input keys 73b on a surface 82a. When the electronic apparatus is folded, the surface 82a is brought in face-to-face contact with one side of the display unit housing 81, namely, one side of the LCD 71. On the other side of the display unit housing 81, input keys 73a are disposed in the space unoccupied by the LCD 71.

The surface 82a has a detector 86 near the edge tangent to the hinge 83. The detector 86 monitors the state of the LCD 71 similarly to the above-mentioned detectors.

In the same fashion with this embodiment as with the previous embodiments, the surface 82a serves as a reflective surface to reflect the light to the LCD 71. Besides, the surface 82a may be made of such material as is reflexible and semi-pervious to the incident light as with the surface 22a described in the first embodiment, or may be made semi-pervious to the light by applying a semi-pervious coating etc. thereto. A light source such as an EL device or LED may be placed inside the operation unit housing 82 as a backlight for lighting the surface 82*a*.

In addition, at least part of the input keys 73*b* disposed on the surface 82*a* is made of such material as is semi-pervious to the incident light, and their surfaces are also made semi-reflexible. Thus, the surface 82*a* operates to similar effect to that obtained in the above embodiments.

In this construction, for example, input keys that are frequently used may be disposed on the display unit housing 81 as the input keys 73*a*, and keys for use in particular input operation may be disposed on the operation unit housing 82 as the input keys 73*b*. On the occasion of using the input keys 73*b*, the electronic apparatus is unfolded. When the apparatus is closed, the LCD 71 forms a (all-)reflective LCD with the surface 82*a*, or forms a semi-transmissive LCD with the backlight inside the housing 82. Consequently, the visibility of the display on the LCD 71 is improved for both bright and dark places, and the display function of the LCD 71 is enhanced.

The operation of the electronic apparatus with LCD in the third embodiment is approximately the same as that described in connection with FIGS. 5 to 7 in the first embodiment, and therefore omitted from the specification.

As is described above, in accordance with the third embodiment of the present invention, it is possible to place input keys that are frequently used on the outer surface of the electronic apparatus, and less frequently used keys on the inner surface. Thereby, the usability of the apparatus can be improved. In addition, since input keys are also disposed on the display unit housing, the electronic apparatus is provided with more available space for input keys. Thus it is possible to design an electronic apparatus having more input keys without enlarging its size.

As with the first embodiment, the surface 82*a* of the operation unit housing 82 serves as a reflecting board and also a backlight for lighting the LCD 71 together with the input keys. With this construction, the visibility of the display on the LCD 71 is improved, and the display on the LCD 71 can be suitably illuminated for the respective bright and dark places when users are performing key operation.

Besides, in this embodiment, the surface 82*a* is made of material that is reflexible as well as semi-pervious to the incident light, or provided with a layer of coatings that is reflexible as well as semi-pervious to the incident light, and a light source is disposed thereunder. Thereby, the surface 82*a* functions as a semi-reflective surface and also a backlight for lighting the LCD 71, and thus the LCD 71 forms a semi-reflective/semi-transmissive LCD with the operation unit housing 82. Furthermore, the side opposite to the surface 82*a* of the operation unit housing 82 may also function as a semi-reflective surface and a backlight. In this construction, by applying a wide variety of patterns and colors to the reflecting/semi-reflecting boards on the respective sides of the operation unit housing 82 and the backlight, it is possible to express users' individuality. This applies to the other embodiments.

[Fourth Embodiment]

In the following, an electronic apparatus with LCD according to the fourth embodiment of the present invention will be explained.

Figure 14A:
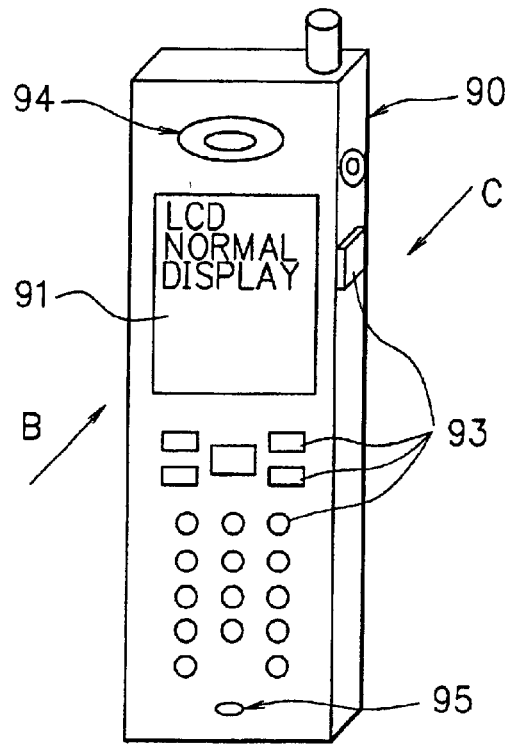
FIG. 14(a) is a diagram showing a front view of a cellular phone, to which the configuration of an electronic apparatus with LCD according to the fourth embodiment of the present invention is applied.
Figure 14B:
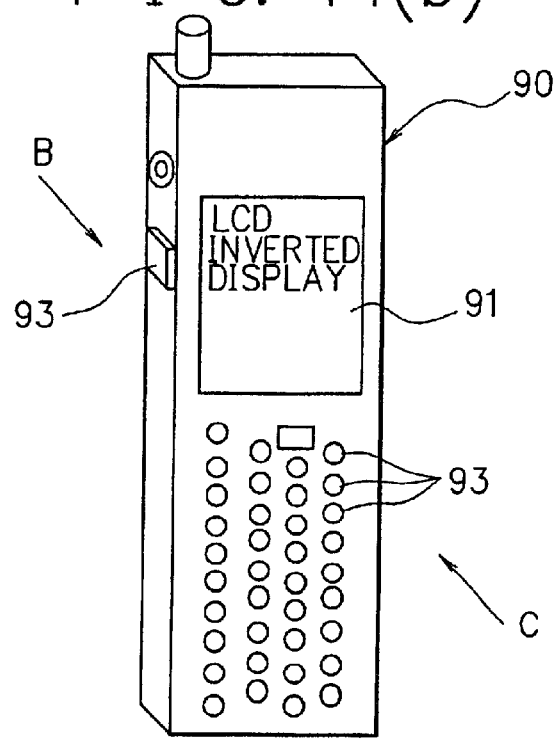
FIG. 14(b) is a diagram showing a back view of the cellular phone of FIG. 14(a).

FIGS. 14(*a*) and 14(*b*) are diagrams showing a cellular phone to which the configuration of the electronic apparatus is applied. The cellular phone in the fourth embodiment has the same construction as described previously for the electronic apparatus in the first embodiment with reference to FIG. 2 but for the detector.

Referring to FIG. 14, the cellular phone 90 comprises an all-transmissive LCD 91, a plurality of input keys 93, a receiver 94 and a microphone 95. The LCD 91 is fitted to the cellular phone 90 so as to be viewable on both sides of the phone 90. The LCD 91 has the same construction as described previously for the LCD 1 in the first embodiment. The phone 90 has a platy shape, and provided with the input keys 93 on both front and back surfaces and the sides. A user operates the cellular phone with the input keys 93.

The cellular phone 90 further comprises a peripheral circuit and a control section, which are the same as the peripheral circuit 4 and control section 5 shown in FIG. 2, a detector for monitoring input operation through the input keys 93 disposed on the respective sides of the cellular phone 90, and a display control means for controlling the LCD 91 to switch display conditions between the normal display and inverted display according to the detection result by the detector. The detector monitors inputs through the input keys 93, and detects the side on which input keys that have been pressed by a user are placed.

The receiver 94 for converting electric signals into sound is placed, for example, above the LCD 91 on the front side of the cellular phone 90. The microphone 95 is placed, for example, below the input keys 93 on the front side of the cellular phone 90.

The operation of the cellular phone in the fourth embodiment is the same as that described in connection with FIG. 5 in the first embodiment, and therefore omitted from the specification.

As is described above, in accordance with the fourth embodiment of the present invention, the display contents of the LCD 71 can be checked on both sides of the cellular phone. Consequently, it is possible to allocate the input keys for inputting numbers and characters to the respective sides of the cellular phone 90, and secure the available space for the input keys without enlarging the size of the cellular phone. That is, the cellular phone can be provided with many input keys without being enlarged in size. This facilitates the design of small electronic apparatuses such as cellular phones. Moreover, since the input keys for characters can be placed separately from the input keys for numbers on the different side, it is easy for users to input characters. Additionally, it is possible to remove the inconvenience of having to carry a keyboard in addition to the cellular phone.

As set forth hereinabove, in an electronic apparatus in accordance with one aspect of the present invention, a transmissive LCD is hingedly connected to an operation unit housing, and display images shown on the LCD is inverted by a display control means if necessary so as to be viewable on the respective sides of the LCD. In this construction, at least part of the surface of the operation unit housing, which faces the LCD when the apparatus is folded, is a reflective surface for reflecting the light to the LCD. Thus, the visibility of the display on the LCD is improved in bright places.

In another aspect of the present invention, a light source for illuminating input keys also illuminates the transmissive LCD. Thus, the visibility of the display on the LCD is improved in dark places.

In another aspect of the present invention, the surfaces of the input keys are also reflexible, and it is possible to light the display of the LCD in a way corresponding to each of blight and dark places.

In yet another aspect of the present invention, the light source for illuminating the transmissive LCD when it is laid on one side of the operation unit housing is placed inside the operation unit housing. Besides, at least part of the other side of the operation unit housing is a reflective surface for reflecting the light to the LCD when the LCD is laid on the other side. Thus, the visibility of the display on the LCD can be improved by putting the LCD on either side of the operation unit housing depending on whether the place is blight or dark.

Moreover, in an electronic apparatus in accordance with another aspect of the present invention, a transmissive LCD and first and second operation unit housings are hingedly connected to each other. In this construction, the first unit has a reflective surface. The second unit is provided with a light source for illuminating the LCD. Thus, the visibility of the display on the LCD can be improved by putting the LCD on either first or second unit depending on whether the place is blight or dark.

Furthermore, in an electronic apparatus in accordance with another aspect of the present invention, a transmissive LCD is fitted to an operation unit housing so as to be viewable on both sides. In this construction, input keys are disposed on plural sides of the operation unit housing, and a display control means controls the LCD to invert display images if necessary depending on which side the input keys that have been pressed by a user belong to. Thus, it is possible to secure enough space for the input keys on an electronic apparatus such as a cellular phone, which is required being smaller and thinner. With this construction, it is possible to provide such a cellular phone as has a function for visiting a Web site and an e-mail function with dedicated character input keys without enlarging the size of the cellular phone. Thus input operation on the cellular phone can be facilitated. Moreover, the disadvantage of having to carry a keyboard in addition to the cellular phone can be removed. Furthermore, the cellular phone can be fitted with many input keys without being enlarged in size. This facilitates the design of electronic apparatuses, which are required to be smaller.

While the preferred embodiments of the present invention have been described using specific terms, such description is for illustrative purposes only, and it is to be understood that changes and variations may be made without departing from the spirit or the scope of the following claims.

What is claimed is:

1. An electronic apparatus, comprising:
   a first housing, which is fitted with an LCD in such a manner that display images are viewable on both sides of the LCD; and
   a second housing connected to said first housing by a hinge and including an input key area comprising at least one of a reflective surface and a backlight for said LCD.

2. The electronic apparatus according to claim 1, wherein said LCD comprises a transmissive LCD.

3. The electronic apparatus according to claim 1, further comprising:
   a control section operatively coupled to a peripheral circuit for controlling said electronic apparatus, said control section comprising a display control section to control a display operation of said LCD.

4. The electronic apparatus according to claim 1, further comprising:
   a display control section operatively coupled to said LCD to control the display operation of said LCD.

5. The electronic apparatus according to claim 1, wherein said both sides display a bilaterally symmetric image of each other.

6. The electronic apparatus according to claim 1, wherein said display images are inverted in one of a horizontal direction and a vertical direction.

7. The electronic apparatus according to claim 1, wherein the display images are simultaneously viewable on both sides of the LCD.

8. An electronic apparatus, comprising:
   two or more housings, which are connected to each other by a hinge in a manner permitting a turning movement of each housing, and a first housing of said two or more housings which is fitted with an LCD in such a manner that display images are viewable on both sides of the LCD, and a second housing including an input key area comprising at least one of a reflective surface and a backlight for said LCD.

9. The electronic apparatus with LCD claimed in claim 8, wherein one side of said second housing of said two or more housings, which is in face-to-face contact with the first housing of said two or more housings where the LCD is disposed, is made into a said reflecting said reflective surface by a surface treatment.

10. The electronic apparatus with LCD claimed in claim 8, wherein one side of said second housing of said two or more housings, which is in face-to-face contact with the first housing of said two or more housings where the LCD is disposed, is made into said reflective surface by a surface treatment, and
    wherein said backlight comprises a light source which is disposed inside the second housing.

11. The electronic apparatus with LCD claimed in claim 8, wherein one side of said second housing of said two or more housings, which is in face-to-face contact with the first housing of said two or more housings where the LCD is disposed, is made into said reflective surface by a surface treatment, and
    wherein said backlight comprises a light source which is disposed inside the second housing, and
    the light source is one of an EL device and an LED.

12. The electronic apparatus according to claim 8, wherein said LCD is viewable when said hinge is any position, including one of an open position and a closed position.

13. The electronic apparatus according to claim 8,
    wherein said input key area comprises input keys which are disposed on said second housing, and which comprise one a reflective surface and a light-emitting surface.

14. The electronic apparatus according to claim 8, wherein said LCD comprises one of an all reflective LCD and an all-transmissive LCD.

15. The electronic apparatus according to claim 8, wherein the display images are simultaneously viewable on both sides of the LCD.

16. An electronic apparatus, comprising:
    a first housing, which is fitted with an LCD in such a manner that display images are viewable on both sides of the LCD;
    a second housing connected to said first housing by a hinge and including an input key area comprising at least one of a reflective surface and a backlight for said LCD; and
    a display control means for controlling the LCD to switch display conditions between a normal display, in which display images are not inverted, and an inverted display, in which inverted images of the normal display images are displayed.

17. The electronic apparatus according to claim 16, wherein the display images are simultaneously viewable on both sides of the LCD.

18. An electronic apparatus, comprising:
    two or more housings, which are connected to each other by a hinge in a manner permitting a turning movement of each housing, and a first housing of said two or more housings which is fitted with an LCD in such a manner that display images are viewable on both sides of the LCD, and a second housing including an input key area comprising at least one of a reflective surface and a backlight for said LCD; and a display control means for controlling the LCD to switch display conditions between a normal display, in which display images are not inverted, and an inverted display, in which inverted images of the normal display images are displayed.

19. The electronic apparatus with LCD claimed in claim 18, wherein one side of said second housing of said two or more housings, which is in face-to-face contact with the first housing of said two or more housings where the LCD is disposed, is made into said reflective surface by a surface treatment.

20. The electronic apparatus with LCD claimed in claim 18, wherein one side of said second housing of said two or more housings, which is in face-to-face contact with the first housing of said two or more housings where the LCD is disposed, is made into said reflective surface by a surface treatment, and wherein said backlight comprises a light source which is disposed inside the second housing.

21. The electronic apparatus with LCD claimed in claim 18, wherein one side of said second housing of said two or more housings, which is in face-to-face contact with the first housing of said two or more housings where the LCD is disposed, is made into said reflective surface by a surface treatment, and wherein said backlight comprises a light source which is disposed inside the second housing, and the light source is one of an EL device and an LED.

22. The electronic apparatus according to claim 18, wherein the display images are simultaneously viewable on both sides of the LCD.

23. An electronic apparatus, comprising:

a first housing, which is fitted with an LCD in such a manner that display images are viewable on both sides of the LCD;

a second housing connected to said first housing by a hinge and including an input key area comprising at least one of a reflective surface and a backlight for said LCD;

a display control means for controlling the LCD to switch display conditions between a normal display, in which display images are not inverted, and an inverted display, in which inverted images of the normal display images are displayed; and a detector for detecting whether the electronic apparatus is open, or on which side of a housing input key operation has been performed, wherein the display control means controls the LCD based on the detection result by the detector.

24. The electronic apparatus according to claim 23, wherein the display images are simultaneously viewable on both sides of the LCD.

25. An electronic apparatus, comprising:

two or more housings, which are connected to each other by a hinge in a manner permitting a turning movement of each housing, and a first housing of said two or more housings of which is fitted with an LCD in such a manner that display images are viewable on both sides of the LCD, and a second housing including an input key area comprising at least one of a reflective surface and a backlight for said LCD;

a display control means for controlling the LCD to switch display conditions between a normal display, in which display images are not inverted, and an inverted display, in which inverted images of the normal display images are displayed; and a detector for detecting whether the electronic apparatus is open, or on which side of a housings input key operation has been performed, wherein the display control means controls the LCD based on the detection result by the detector.

26. The electronic apparatus with LCD claimed in claim 25, wherein one side of said second housing of said two or more housings, which is in face-to-face contact with the first housing of said two or more housings where the LCD is disposed, is made into said reflective surface by a surface treatment.

27. The electronic apparatus with LCD claimed in claim 25, wherein one side of said second housing of said two or more housings, which is in face-to-face contact with the first housing of said two or more housings where the LCD is disposed, is made into said reflective surface by a surface treatment, and wherein said backlight comprises a light source which is disposed inside the second housing.

28. The electronic apparatus with LCD claimed in claim 25, wherein one side of said second housing of said two or more housings, which is in face-to-face contact with the first housing of said two or more housings where the LCD is disposed, is made into said reflective surface by a surface treatment, and wherein said backlight comprises a light source which is disposed inside the second housing, and the light source is one of an EL device and an LED.

29. The electronic apparatus according to claim 25, wherein said LCD comprises a semi-transmissive LCD with a backlight inside one of said each housing.

30. The electronic apparatus according to claim 25, wherein the display images are simultaneously viewable on both sides of the LCD.

31. An electronic apparatus, comprising:

two or more housings, which are connected to each other by a hinge in a manner permitting a turning movement of each housing, and a first housing of said two or more housings, which is fitted with an LCD in such a manner that display images are viewable on both sides of the LCD and a second housing including an input key area comprising at least one of a reflective surface and a backlight for said LCD;

a display control means for controlling the LCD to switch display conditions between a normal display, in which display images are not inverted, and an inverted display, in which inverted images of the normal display images are displayed; and a detector for detecting whether the electronic apparatus is open, or on which side of a housings input key operation has been performed, wherein the display control means controls the LCD based on the detection result by the detector, and wherein a switch of the detector is activated when the electronic apparatus is folded or by changes in brightness and other magnetic, electrical or mechanical changes.

32. The electronic apparatus with LCD claimed in claim 31, wherein one side of said second housing of said two or more housings, which is in face-to-face contact with the first housing of said two or more housings where the LCD is disposed, is made into said reflective surface by a surface treatment.

33. The electronic apparatus with LCD claimed in claim 31, wherein one side of said second housing of said two or more housings, which is in face-to-face contact with the first housing of said two or more housings where the LCD is disposed, is made into said reflective surface by a surface treatment, and wherein said backlight comprises a light source which is disposed inside the second housing.

34. The electronic apparatus with LCD claimed in claim 31, wherein one side of the second housing of said two or more housings, which is in face-to-face contact with the first housing of said two or more housings where the LCD is disposed, is made into said reflective surface by a surface treatment, and wherein said backlight comprises a light source which is disposed inside the second housing, and the light source is one of an EL device and an LED.

35. The electronic apparatus according to claim 31, wherein the display images are simultaneously viewable on both sides of the LCD.

36. An electronic apparatus, comprising:

a first housing, which is fitted with a display in such a manner that display images are viewable on both sides of the display; and a second housing comprising input keys and connected to said first housing by a hinge, said second housing comprising at least one of a reflective surface disposed on said input keys and a backlight located behind said input keys for illuminating said display.

* * * * *